United States Patent
Hart et al.

(10) Patent No.: US 8,439,789 B2
(45) Date of Patent: May 14, 2013

(54) MULTI-SPEED TRANSMISSION HAVING THREE PLANETARY GEAR SETS

(75) Inventors: James M. Hart, Belleville, MI (US); James B. Borgerson, Clarkston, MI (US); Scott H. Wittkopp, Ypsilanti, MI (US); Andrew W. Phillips, Rochester, MI (US); Clinton E. Carey, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 286 days.

(21) Appl. No.: 12/840,918

(22) Filed: Jul. 21, 2010

(65) Prior Publication Data

US 2011/0034289 A1    Feb. 10, 2011

Related U.S. Application Data

(60) Provisional application No. 61/231,505, filed on Aug. 5, 2009.

(51) Int. Cl.
 *F16H 3/62* (2006.01)
(52) U.S. Cl.
 USPC ........................................... 475/275; 475/286

(58) Field of Classification Search .................. 475/276, 475/286
See application file for complete search history.

(56) References Cited

U.S. PATENT DOCUMENTS

| | | | |
|---|---|---|---|
| 6,442,969 B1 | 9/2002 | Rojey et al. | |
| 6,626,790 B2 * | 9/2003 | Raghavan et al. | 475/277 |
| 6,705,967 B2 * | 3/2004 | Raghavan et al. | 475/275 |
| 6,709,360 B2 | 3/2004 | Raghavan et al. | |
| 6,746,358 B2 * | 6/2004 | Bucknor et al. | 475/276 |
| 6,945,900 B2 * | 9/2005 | Usoro et al. | 475/276 |
| 7,118,508 B2 * | 10/2006 | Usoro et al. | 475/275 |
| 7,153,231 B2 * | 12/2006 | Usoro et al. | 475/275 |
| 7,226,382 B2 * | 6/2007 | Bucknor et al. | 475/275 |
| 7,306,534 B2 * | 12/2007 | Bucknor et al. | 475/275 |
| 7,387,585 B2 * | 6/2008 | Bucknor et al. | 475/276 |
| 8,016,709 B2 * | 9/2011 | Wittkopp et al. | 475/276 |
| 2006/0068966 A1 * | 3/2006 | Klemen | 475/275 |

* cited by examiner

*Primary Examiner* — Justin Holmes
*Assistant Examiner* — Jacob S Scott (57) ABSTRACT

A transmission is provided having an input member, an output member, three planetary gear sets, a plurality of coupling members and a plurality of torque transmitting devices. Each of the planetary gear sets includes first, second and third members. The torque transmitting devices include clutches and brakes.

9 Claims, 7 Drawing Sheets

| GEAR STATE | GEAR RATIO | RATIO STEP | TORQUE TRANSMITTING ELEMENTS ||||| 
|---|---|---|---|---|---|---|---|
| | | | 32 | 26 | 30 | 34 | 28 |
| REV | -5.667 | | X | G | | | |
| N | | -1.13 | O | | | | |
| 1ST | 5.000 | | X | | G | | |
| 2ND | 3.400 | 1.47 | X | | | X | |
| 3RD | 2.224 | 1.53 | | | X | X | |
| 4TH | 1.563 | 1.42 | | X | | X | |
| 5TH | 1.262 | 1.24 | | | | X | X |
| 6TH | 1.000 | 1.26 | | | X | | X |

X = ON - ENGAGED CARRYING TORQUE
O = ON - ENGAGED NOT CARRYING TORQUE
G = ON - GARAGE SHIFT ELEMENT ON AND CARRYING TORQUE

| GEAR STATE | GEAR RATIO | RATIO STEP | TORQUE TRANSMITTING ELEMENTS | | | | |
|---|---|---|---|---|---|---|---|
| | | | 132 | 130 | 134 | 126 | 128 |
| REV | -3.200 | | X | | | | X |
| N | | -0.84 | O | | | | |
| 1ST | 3.800 | | X | X | | | |
| 2ND | 2.333 | 1.63 | | X | X | | |
| 3RD | 1.600 | 1.46 | | X | | | X |
| 4TH | 1.299 | 1.23 | | X | | X | |
| 5TH | 1.000 | 1.30 | | | | X | X |
| 6TH | 0.762 | 1.31 | | | X | X | |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS ||||| 
|---|---|---|---|---|---|---|---|
| | | | 230 | 232 | 234 | 226 | 228 |
| REV | -1.800 | | | X | | X | |
| N | | -0.40 | | O | | | |
| 1ST | 4.497 | | | X | X | | |
| 2ND | 2.737 | 1.64 | X | | X | | |
| 3RD | 2.033 | 1.35 | | | X | X | |
| 4TH | 1.667 | 1.22 | X | | | | X |
| 5TH | 1.346 | 1.24 | X | | | | X |
| 6TH | 1.000 | 1.35 | | | | X | X |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS ||||| 
|---|---|---|---|---|---|---|---|
| | | | 334 | 332 | 330 | 328 | 326 |
| REV | -6.794 | | | X | X | | |
| N | | -1.35 | | | | | |
| 1ST | 5.015 | | | X | | X | |
| 2ND | 3.500 | 1.43 | X | X | | | |
| 3RD | 2.520 | 1.39 | X | | | X | |
| 4TH | 1.767 | 1.43 | X | | X | | |
| 5TH | 1.358 | 1.30 | X | | | | X |
| 6TH | 1.000 | 1.36 | | | X | X | |

X = ON - ENGAGED CARRYING TORQUE
O = ON - ENGAGED NOT CARRYING TORQUE

MULTI-SPEED TRANSMISSION HAVING THREE PLANETARY GEAR SETS

CROSS-REFERENCE TO RELATED APPLICATIONS

This application claims priority to U.S. Provisional Application No. 61/231,505, filed on Aug. 5, 2009, which is hereby incorporated in its entirety herein by reference.

FIELD

The invention relates generally to a multiple speed transmission having a plurality of planetary gear sets and a plurality of torque transmitting devices and more particularly to a transmission having six or more speeds, three planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, three planetary gear sets, a plurality of coupling members and a plurality of torque transmitting devices. Each of the planetary gear sets includes first, second and third members. The torque transmitting devices are for example clutches and brakes.

In one embodiment, a transmission includes an input member, an output member, first, second and third planetary gear sets each having first, second and third members, a first interconnecting member continuously interconnecting the second member of the first planetary gear set with the third member of the second planetary gear set, a second interconnecting member continuously interconnecting the first member of the first planetary gear set with the second member of the third planetary gear set, and a third interconnecting member continuously interconnecting the third member of the third planetary gear set with the second member of the second planetary gear set. A first torque transmitting mechanism is selectively engageable to interconnect the first member of the first planetary gear set and the second member of the third planetary gear set with the first member of the second planetary gear set and the input member, a second torque transmitting mechanism is selectively engageable to interconnect the first member of the third planetary gear set with the first member of the second planetary gear set and the input member, a third torque transmitting mechanism is selectively engageable to interconnect the third member of the first planetary gear set with a stationary member, a fourth torque transmitting mechanism is selectively engageable to interconnect the first member of the first planetary gear set and the second member of the third planetary gear set with the stationary member, and a fifth torque transmitting mechanism selectively engageable to interconnect the first member of the third planetary gear set with the stationary member. The torque transmitting mechanisms are selectively engageable in combinations of at least two to establish at least six forward speed ratios and at least one reverse speed ratio between the input member and the output member.

In another embodiment, a transmission includes an input member, an output member, first, second and third planetary gear sets each having first, second and third members, a first interconnecting member continuously interconnecting the first member of the first planetary gear set with the first member of the second planetary gear set, a second interconnecting member continuously interconnecting the second member of the first planetary gear set with the third member of the second planetary gear set, and a third interconnecting member continuously interconnecting the second member of the second planetary gear set with the third member of the third planetary gear set. A first torque transmitting mechanism is selectively engageable to interconnect the third member of the first planetary gear set with the second member of the third planetary gear set and the output member, a second torque transmitting mechanism is selectively engageable to interconnect the first member of the first planetary gear set, the first member of the second planetary gear set, and the input member with the first member of the third planetary gear set, a third torque transmitting mechanism is selectively engageable to interconnect the third member of the first planetary gear set with a stationary member, a fourth torque transmitting mechanism is selectively engageable to interconnect the second member of the first planetary gear set and the third member of the second planetary gear set with the stationary member, and a fifth torque transmitting mechanism is selectively engageable to interconnect the first member of the third planetary gear set with the stationary member. The torque transmitting mechanisms are selectively engageable in combinations of at least two to establish at least six forward speed ratios and at least one reverse speed ratio between the input member and the output member.

In another embodiment, a transmission includes an input member, an output member, first, second and third planetary gear sets each having first, second and third members, a first interconnecting member continuously interconnecting the first member of the first planetary gear set with the first member of the second planetary gear set, and a second interconnecting member continuously interconnecting the second member of the first planetary gear set with the third member of the second planetary gear set and the third member of the third planetary gear set. A first torque transmitting mechanism is selectively engageable to interconnect the second member of the second planetary gear set with the first member of the third planetary gear set and the output member, a second torque transmitting mechanism is selectively engageable to interconnect the first member of the first planetary gear set and the first member of the second planetary gear set with the output member and the second member of the third planetary gear set, a third torque transmitting mechanism is selectively engageable to interconnect the first member of the first planetary gear set and the first member of the second planetary gear set with the first member of the third planetary gear set and the input member, a fourth torque transmitting mechanism is selectively engageable to interconnect the second member of the second planetary gear set with a stationary member, and a fifth torque transmitting mechanism selectively engageable to interconnect the third member of the first planetary gear set with the stationary member. The torque transmitting mechanisms are selectively engageable in combinations of at least two to establish at least six forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

At the outset, it should be appreciated that the embodiments of the six speed automatic transmission of the present invention have an arrangement of permanent mechanical connections between the elements of the three planetary gear sets. A second component or element of a first planetary gear set is permanently coupled to a first component or element of a second planetary gear set. A third component or element of the first planetary gear set is permanently coupled to a second component or element of a third planetary gear set. A first component or element of the third planetary gear set is permanently coupled to a second component or element of the second planetary gear set.

Figure 1:
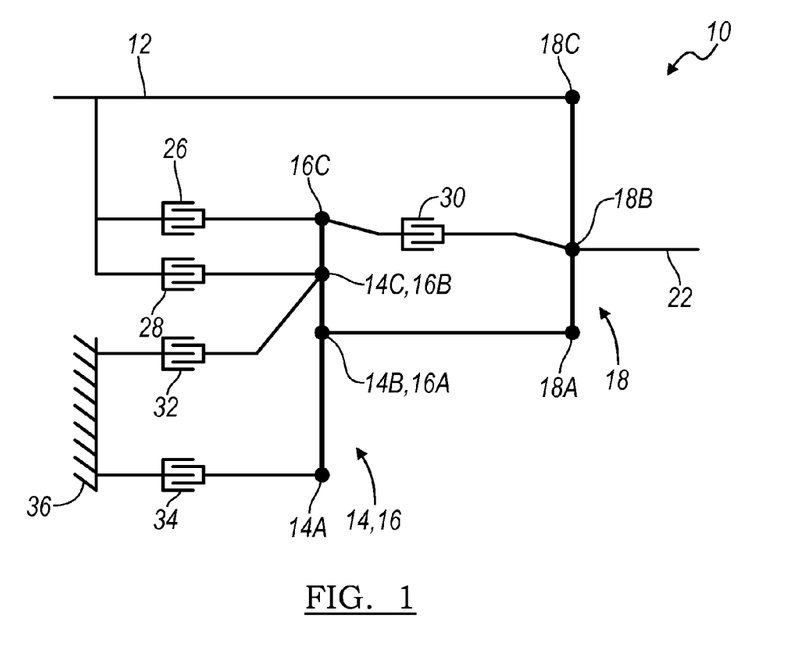
FIG. 1 is a lever diagram of an embodiment of a six speed transmission according to the present invention.

Referring now to FIG. 1, an embodiment of a six speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18 and an output shaft or member 22. In the lever diagram of FIG. 1, the levers for the first planetary gear set 14 and the second planetary gear set 16 have been combined into a single four node lever 14,16 having: a first node 14A, a second node 14B, 16A, a third node 14C, 16B and a fourth node 16C. The third planetary gear set 18 has three nodes: a first node 18A, a second node 18B and a third node 18C.

The input member 12 is continuously coupled to the third node 18C of the third planetary gear set 18. The output member 22 is coupled to the second node 18B of the third planetary gear set 18. The third node 14C of the first planetary gear set 14 is coupled to the second node 16B of the second planetary gear set 16. The first node 16A of the second planetary gear set 16 is coupled to the second node 14B of the first planetary gear set 14 and to the first node 18A of the third planetary gear set 18.

A first clutch 26 selectively connects the input member 12 and the third node 18C of the third planetary gear set 18 with the third node 16C of the second planetary gear set 16. A second clutch 28 selectively connects the input member 12 and the third node 18C of the third planetary gear set 18 with the third node 14C of the first planetary gear set 14 and the second node 16B of the second planetary gear set 16. A third clutch 30 selectively connects the third node 16C of the second planetary gear set 16 with the second node 18B of the third planetary gear set 18 and the output member or shaft 22. A first brake 32 selectively connects the third node 14C of the first planetary gear set 14 and the second node 16B of the second planetary gear set 16 with a stationary member or transmission housing 36. A second brake 34 selectively connects the first node 14A of the first planetary gear set 14 with a stationary member or transmission housing 36.

Figure 2:
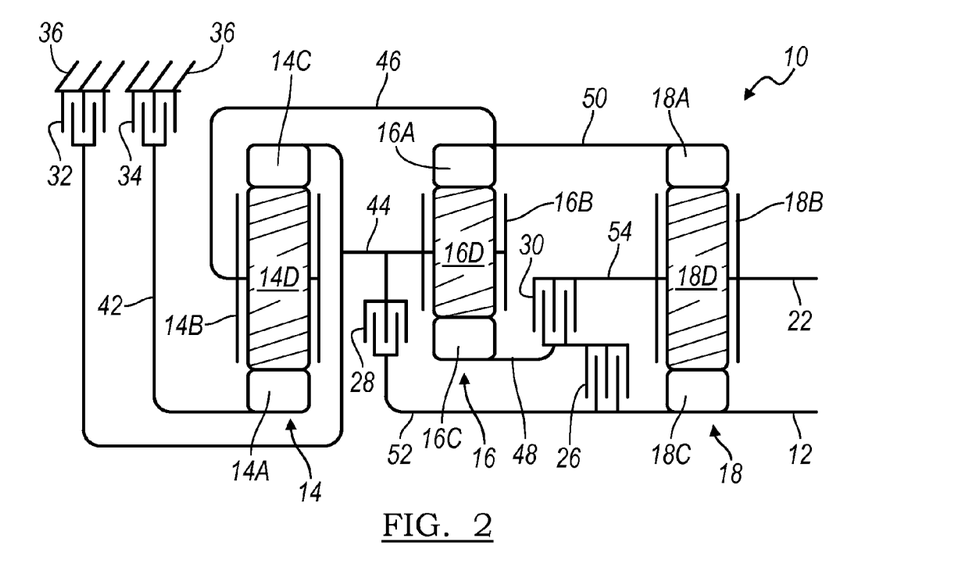
FIG. 2 is a diagrammatic illustration of an embodiment of a six speed transmission according to the present invention.

Referring now to FIG. 2, a stick diagram presents a schematic layout of the embodiment of the six speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14A, a ring gear member 14C and a planet gear carrier member 14B that rotatably supports a set of planet gears 14D (only one of which is shown). The sun gear member 14A is connected for common rotation with a first shaft or interconnecting member 42. The ring gear member 14C is connected for common rotation with a second shaft or interconnecting member 44. The planet carrier member 14B is connected for common rotation with a third shaft or interconnecting member 46. The planet gears 14D are each configured to intermesh with both the sun gear member 14A and the ring gear member 14C.

The planetary gear set 16 includes a sun gear member 16C, a ring gear member 16A and a planet gear carrier member 16B that rotatably supports a set of planet gears 16D (only one of which is shown). The sun gear member 16C is connected for common rotation with a fourth shaft or interconnecting member 48. The ring gear member 16A is connected for common rotation with the third shaft or interconnecting member 46 and a fifth shaft or interconnecting member 50. The planet carrier member 16B is connected for common rotation with the second shaft or interconnecting member 44. The planet gears 16D are each configured to intermesh with both the sun gear member 16C and the ring gear member 16A.

The planetary gear set 18 includes a sun gear member 18C, a ring gear member 18A and a planet gear carrier member 18B that rotatably supports a set of planet gears 18D (only one of which is shown). The sun gear member 18C is connected for common rotation with sixth shaft or interconnecting member 52 and the input member 12. The ring gear member 18A is connected for common rotation with the fifth shaft or interconnecting member 50. The planet carrier member 18B is connected for common rotation with a seventh shaft or interconnecting member 54 and with the output member or shaft 22. The planet gears 18D are each configured to intermesh with both the sun gear member 18C and the ring gear member 18A.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26, 28, 30 and brakes 32 and 34 allow for selective interconnection of the shafts or interconnecting members, members of the planetary gear sets and the housing. For example, the first clutch 26 is selectively engageable to connect the sixth shaft or interconnecting member 52 and the input member 12 with the fourth shaft or interconnecting member 48. The second clutch 28 is selectively engageable to connect the sixth shaft or interconnecting member 52 and the input member 12 with the second shaft or interconnecting member 44. The third clutch 30 is selectively engageable to connect the fourth shaft or interconnecting member 48 with the seventh shaft or interconnecting member 54 and the output member 22. The first brake 32 is selectively engageable to connect the second shaft or interconnecting member 44 with the stationary element or the transmission housing 36 in order to restrict the member 44 from rotating relative to the transmission housing 36. The second brake 34 is selectively engageable to connect the first shaft or interconnecting member 42 with the stationary element or the transmission housing 36 in order to restrict the member 42 from rotating relative to the transmission housing 36.

Figure 3:
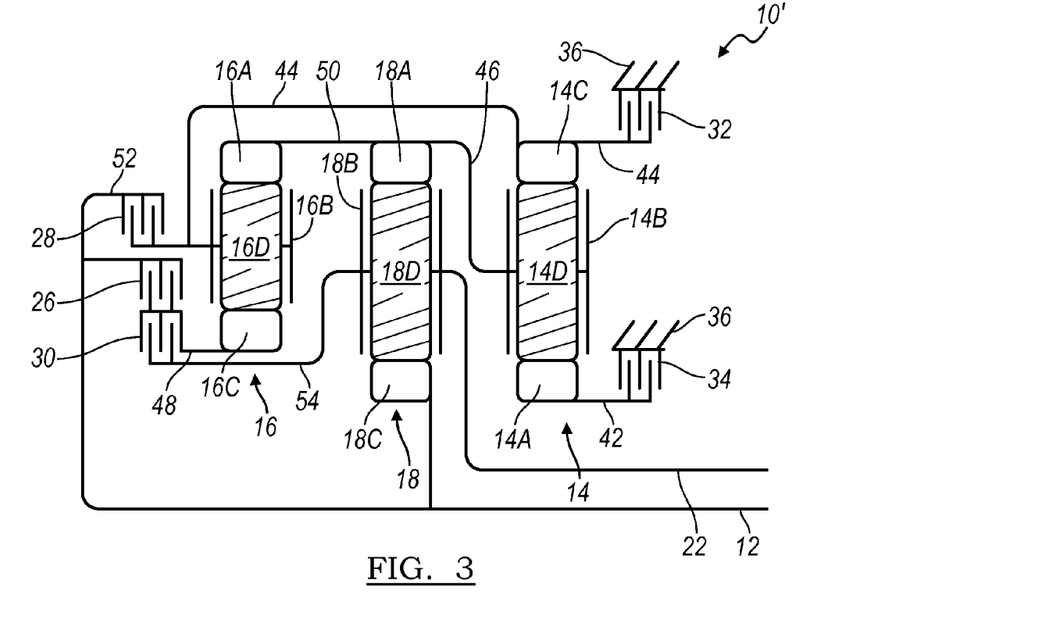
FIG. 3 is a diagrammatic illustration of another embodiment of a six speed transmission according to the present invention.

Referring to FIG. 3, a stick diagram presents a schematic layout of an embodiment of the six speed transmission 10' according to the present invention. In FIG. 3, the numbering from the lever diagram of FIG. 1 and the stick diagram of FIG. 2 is carried over. The clutches and couplings are correspondingly presented whereas the nodes of the planetary gear sets now appear as components of planetary gear sets such as sun gears, ring gears, planet gears and planet gear carriers. The transmission 10' is similar to the transmission 10 shown in FIG. 2, however, the transmission 10' has an arrangement of planetary gear sets 14, 16, and 18 that is different from the arrangement of planetary gear sets 14, 16, and 18 shown in FIG. 2. The planetary gear sets 14, 16, and 18 of the transmission 10' are ordered, from left to right, as follows: 16-18-14. In contrast, the planetary gear sets 14, 16, and 18 of the transmission 10 shown in FIG. 2 are ordered, from left to right, as follows: 14-16-18.

Figure 4:
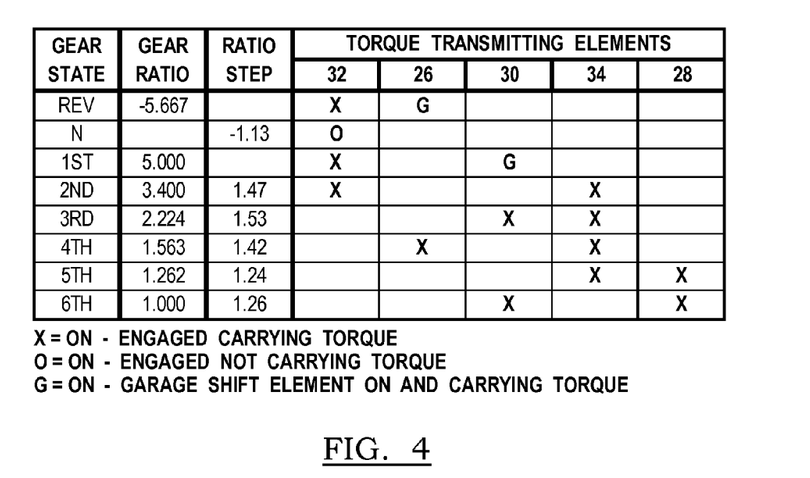
FIG. 4 is a truth table presenting the state of engagement of the various torque transmitting elements in each of the available forward and reverse speeds or gear ratios of the transmissions illustrated in FIGS. 1-3.

Referring now to FIGS. 2-4, the operation of the embodiment of the six speed transmission 10 and 10' will be described. It will be appreciated that transmissions 10 and 10' are capable of transmitting torque from the input shaft or member 12 to the output shaft or member 22 in at least six forward speed or torque ratios and at least one reverse speed or torque ratio. Each forward and reverse speed or torque ratio is attained by engagement of one or more of the torque-transmitting mechanisms (i.e. first clutch 26, second clutch 28, third clutch 30, first brake 32 and second brake 34), as will be explained below. FIG. 4 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. A "G" represents that a garage shift element has to switch on and carrying torque when the transmission mode selector or shifter (Park, Reverse, Neutral, Drive or Low gear selector) is moved from reverse to drive and switch off when shifting back to reverse. Actual numerical gear ratios of the various gear states are also presented although it should be appreciated that these numerical values are exemplary only and that they may be adjusted over significant ranges to accommodate various applications and operational criteria of the transmissions 10 and 10'. An example of the gear ratios that may be obtained using the embodiments of the present invention are also shown in FIG. 4. Of course, other gear ratios are achievable depending on the gear diameter, gear teeth count and gear configuration selected.

To establish a reverse gear, the first clutch 26 and the first brake 32 are engaged or activated. The first clutch 26 connects the sixth shaft or interconnecting member 52 and the input member 12 with the fourth shaft or interconnecting member 48. The first brake 32 connects the second shaft or interconnecting member 44 with the stationary element or the transmission housing 36 in order to restrict the member 44 from rotating relative to the transmission housing 36. Likewise, the six forward ratios are achieved through different combinations of clutch and brake engagement, as shown in FIG. 4.

It will be appreciated that the foregoing explanation of operation and gear states of the six speed transmissions 10 and 10' assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Figure 5:
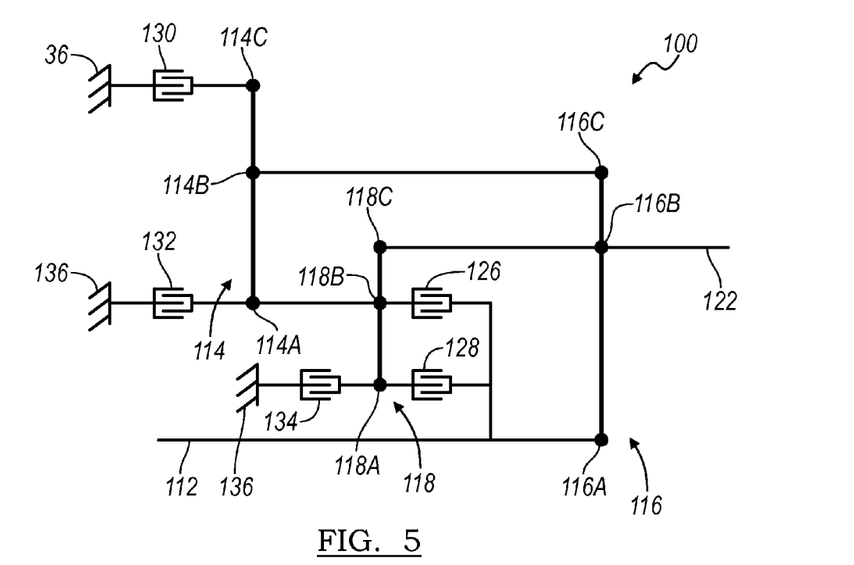
FIG. 5 is a lever diagram of an embodiment of a six speed transmission according to the present invention.

Referring now to FIG. 5, another embodiment of a six speed transmission 100 is illustrated in a lever diagram format. The transmission 100 includes an input shaft or member 112, a first planetary gear set 114, a second planetary gear set 116, a third planetary gear set 118 and an output shaft or member 122. The first planetary gear set 114 has three nodes: a first node 114A, a second node 114B, and a third node 114C. The second planetary gear set 116 has three nodes: a first node 116A, a second node 116B, and a third node 116C. The third planetary gear set 118 has three nodes: a first node 118A, a second node 118B and a third node 118C.

The input member 112 is continuously coupled to the first node 116A of the second planetary gear set 116. The output member 122 is coupled to the third node 118C of the third planetary gear set 118 and to the second node 116B of the second planetary gear set 116. The second node 114B of the first planetary gear set 114 is coupled to the third node 116C of the second planetary gear set 116. The first node 114A of the first planetary gear set 114 is coupled to the second node 118B of the third planetary gear set 118. The third node 118C of the third planetary gear set 118 is coupled to the second node 116B of the second planetary gear set 116 and the output member 122.

A first clutch 126 selectively connects the first node 114A of the first planetary gear set 114 and the second node 118B of the third planetary gear set 118 with the first node 116A of the second planetary gear set 116 and the input member 112. A second clutch 128 selectively connects the first node 118A of the third planetary gear set 118 with the input member 112 and the first node 116A of the second planetary gear set 116. A first brake 130 selectively connects the third node 114C of the first planetary gear set 114 with a stationary member or transmission housing 136. A second brake 132 selectively connects the second node 118B of the third planetary gear set 118 and the first node 114A of the first planetary gear set 114 with a stationary member or transmission housing 136. A third brake 134 selectively connects the first node 118A of the third planetary gear set 118 with a stationary member or transmission housing 136.

Figure 6:
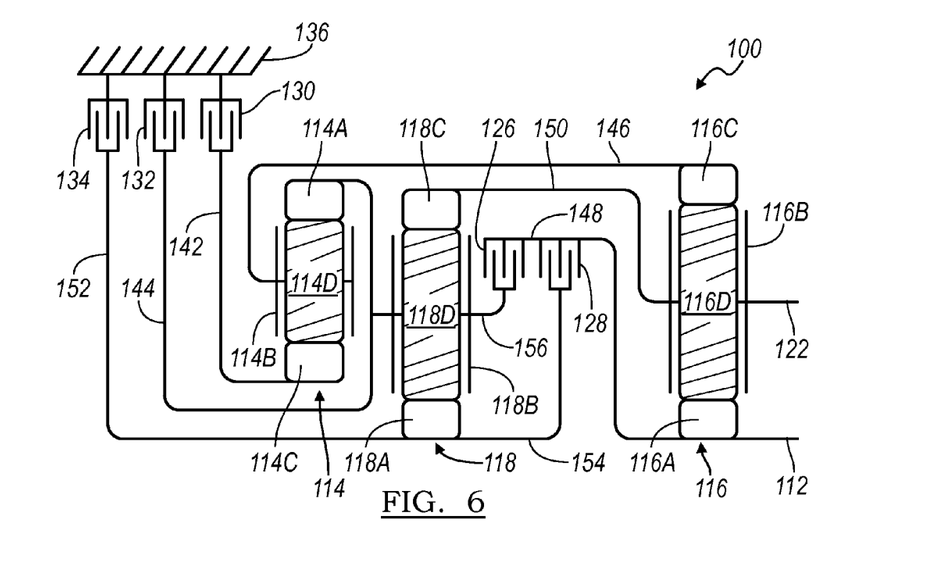
FIG. 6 is a diagrammatic illustration of an embodiment of a six speed transmission according to the present invention.

Referring now to FIG. 6, a stick diagram presents a schematic layout of the embodiment of the six speed transmission 100 according to the present invention. In FIG. 6, the numbering from the lever diagram of FIG. 5 is carried over. The clutches and couplings are correspondingly presented whereas the nodes of the planetary gear sets now appear as components of planetary gear sets such as sun gears, ring gears, planet gears and planet gear carriers.

For example, the planetary gear set 114 includes a sun gear member 114C, a ring gear member 114A and a planet gear carrier member 114B that rotatably supports a set of planet gears 114D (only one of which is shown). The sun gear member 114C is connected for common rotation with a first shaft or interconnecting member 142. The ring gear member 114A is connected for common rotation with a second shaft or interconnecting member 144. The planet carrier member 114B is connected for common rotation with a third shaft or interconnecting member 146. The planet gears 114D are each configured to intermesh with both the sun gear member 114C and the ring gear member 114A.

The planetary gear set 116 includes a sun gear member 116A, a ring gear member 116C and a planet gear carrier member 116B that rotatably supports a set of planet gears 116D (only one of which is shown). The sun gear member 116A is connected for common rotation with a fourth shaft or interconnecting member 148 and the input member 112. The ring gear member 116C is connected for common rotation with the third shaft or interconnecting member 146. The planet carrier member 116B is connected for common rotation with a fifth shaft or interconnecting member 150 and with the output member 122. The planet gears 116D are each configured to intermesh with both the sun gear member 116A and the ring gear member 116C.

The planetary gear set 118 includes a sun gear member 118A, a ring gear member 118C and a planet gear carrier member 118B that rotatably supports a set of planet gears 118D (only one of which is shown). The sun gear member 118A is connected for common rotation with a sixth shaft or interconnecting member 152 and a seventh shaft or interconnecting member 154. The ring gear member 118C is connected for common rotation with the fifth interconnecting member 150. The planet carrier member 118B is connected for common rotation with an eighth shaft or interconnecting member 156 and with the second interconnecting member 144. The planet gears 118D are each configured to intermesh with both the sun gear member 118A and the ring gear member 118C.

The input shaft or member 112 is continuously connected to an engine (not shown) or to a turbine of a torque converter (not shown). The output shaft or member 122 is continuously connected with the final drive unit or transfer case (not shown).

The torque-transmitting mechanisms or clutches 126 and 128 and brakes 130, 132 and 134 allow for selective interconnection of the shafts or interconnecting members, members of the planetary gear sets and the housing. For example, the first clutch 126 is selectively engageable to connect the eighth shaft or interconnecting member 156 and the second shaft or interconnecting member 144 with the fourth shaft or interconnecting member 148 and the input member 112. The second clutch 128 is selectively engageable to connect the sixth shaft or interconnecting member 152 and the seventh shaft or interconnecting member 154 with the fourth shaft or interconnecting member 148 and the input shaft or member 112. The first brake 130 is selectively engageable to connect the first shaft or interconnecting member 142 with the stationary element or the transmission housing 136 in order to restrict the member 142 from rotating relative to the transmission housing 136. The second brake 132 is selectively engageable to connect the second shaft or interconnecting member 144 and the eighth shaft or interconnecting member 156 with the stationary element or the transmission housing 136 in order to restrict the members 144 and 156 from rotating relative to the transmission housing 136. The third brake 134 is selectively engageable to connect the sixth shaft or interconnecting member 152 and the seventh shaft or interconnecting member 154 with the stationary element or the transmission housing 136 in order to restrict the members 152 and 154 from rotating relative to the transmission housing 136.

Figure 7:
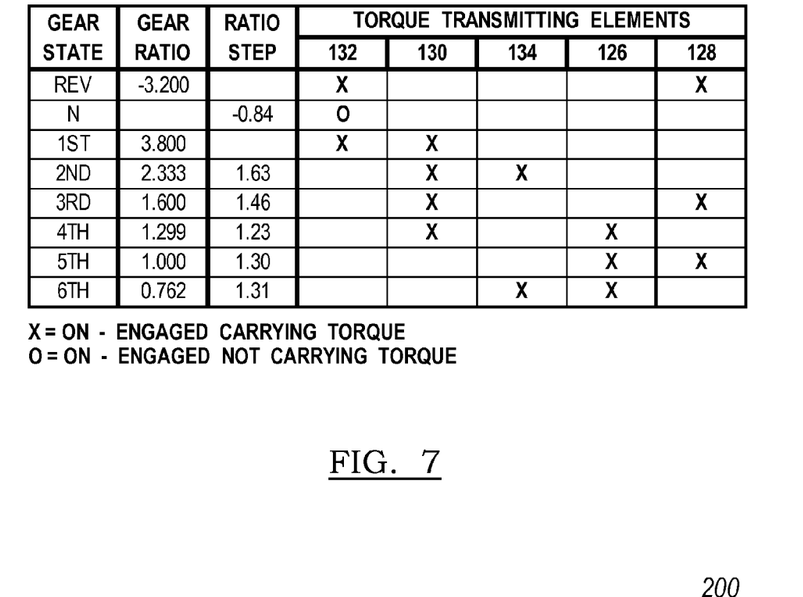
FIG. 7 is a truth table presenting the state of engagement of the various torque transmitting elements in each of the available forward and reverse speeds or gear ratios of the transmission illustrated in FIGS. 5 and 6.

Referring now to FIG. 6 and FIG. 7, the operation of the embodiment of the six speed transmission 100 will be described. It will be appreciated that transmission 100 is capable of transmitting torque from the input shaft or member 112 to the output shaft or member 122 in at least six forward speed or torque ratios and at least one reverse speed or torque ratio. Each forward and reverse speed or torque ratio is attained by engagement of one or more of the torque-transmitting mechanisms (i.e. first clutch 126, second clutch 128, first brake 130, second brake 132, and third brake 134), as will be explained below. FIG. 7 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 100. An example of the gear ratios that may be obtained using the embodiments of the present invention are also shown in FIG. 7. Of course, other gear ratios are achievable depending on the gear diameter, gear teeth count and gear configuration selected.

To establish a reverse gear, the second clutch 128 and the second brake 132 are engaged or activated. The second clutch 128 connects the sixth shaft or interconnecting member 152 and the seventh shaft or interconnecting member 154 with the fourth shaft or interconnecting member 148 and the input shaft or member 112. The second brake 132 connects the second shaft or interconnecting member 144 and the eighth shaft or interconnecting member 156 with the stationary element or the transmission housing 136 in order to restrict the members 144 and 156 from rotating relative to the transmission housing 136. Likewise, the six forward ratios are achieved through different combinations of clutch and brake engagement, as shown in FIG. 7.

It will be appreciated that the foregoing explanation of operation and gear states of the six speed transmission 100 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Figure 8:
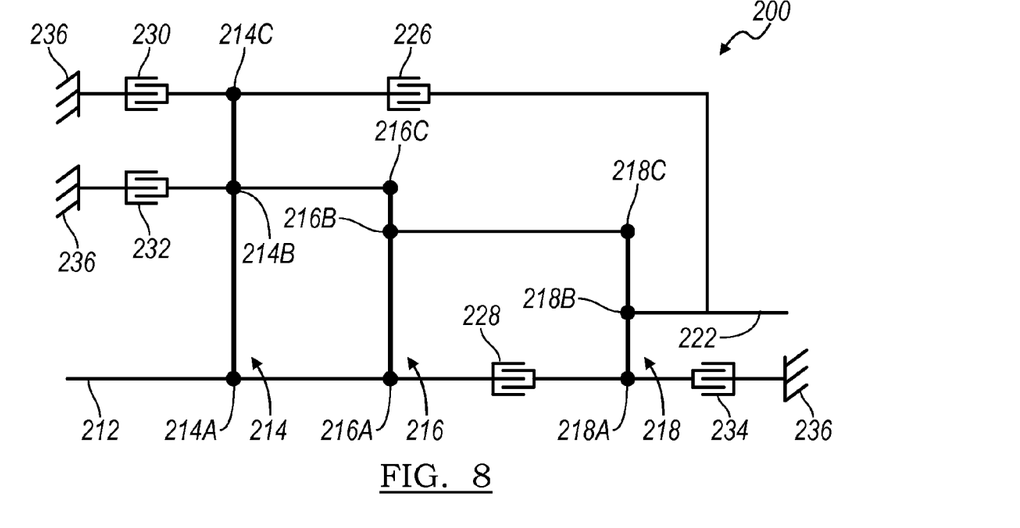
FIG. 8 is a lever diagram of an embodiment of a six speed transmission according to the present invention.

Referring now to FIG. 8, another embodiment of a six speed transmission 200 is illustrated in a lever diagram format. The transmission 200 includes an input shaft or member 212, a first planetary gear set 214, a second planetary gear set 216, a third planetary gear set 218 and an output shaft or member 222. The first planetary gear set 214 has three nodes: a first node 214A, a second node 214B, and a third node 214C. The second planetary gear set 216 has three nodes: a first node 216A, a second node 216B, and a third node 216C. The third planetary gear set 218 has three nodes: a first node 218A, a second node 218B and a third node 218C.

The input member 212 is continuously coupled to the first node 214A of the first planetary gear set 214 and the first node 216A of the second planetary gear set 216. The output member 222 is coupled to the second node 218B of the third planetary gear set 218. The third node 216C of the second planetary gear set 216 is coupled to the second node 214B of the first planetary gear set 214. The second node 216B of the second planetary gear set 216 is coupled to the third node 218C of the third planetary gear set 218. The first node 214A of the first planetary gear set 214 is coupled to the first node 216A of the second planetary gear set 216.

A first clutch 226 selectively connects the third node 214C of the first planetary gear set 214 with the second node 218B of the third planetary gear set 218 and the output member 222. A second clutch 228 selectively connects the first node 214A of the first planetary gear set 214 and the first node 216A of the second planetary gear set 216 with the first node 218A of the third planetary gear set 218. A first brake 230 selectively connects the third node 214C of the first planetary gear set 214 with a stationary member or transmission housing 236. A second brake 232 selectively connects the second node 214B of the first planetary gear set 214 and the third node 216C of the second planetary gear set 216 with a stationary member or transmission housing 236. A third brake 234 selectively connects the first node 218A of the third planetary gear set 218 with a stationary member or transmission housing 236.

Figure 9:
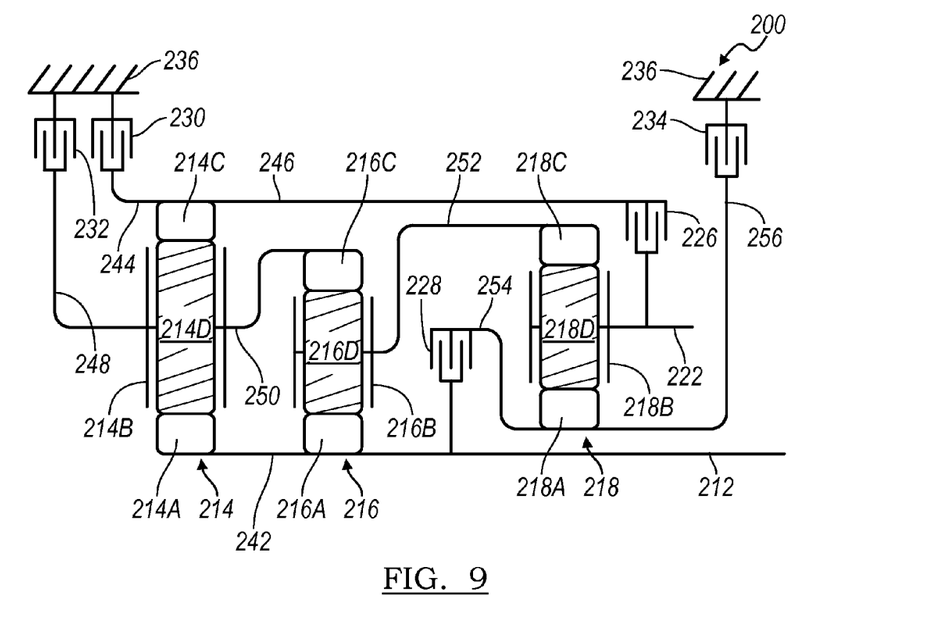
FIG. 9 is a diagrammatic illustration of an embodiment of a six speed transmission according to the present invention.

Referring now to FIG. 9, a stick diagram presents a schematic layout of the embodiment of the six speed transmission 200 according to the present invention. In FIG. 9, the numbering from the lever diagram of FIG. 8 is carried over. The clutches and couplings are correspondingly presented whereas the nodes of the planetary gear sets now appear as components of planetary gear sets such as sun gears, ring gears, planet gears and planet gear carriers.

For example, the planetary gear set 214 includes a sun gear member 214A, a ring gear member 214C and a planet gear carrier member 214B that rotatably supports a set of planet gears 214D (only one of which is shown). The sun gear member 214A is connected for common rotation with a first shaft or interconnecting member 242. The ring gear member 214C is connected for common rotation with a second shaft or interconnecting member 244 and a third shaft or interconnecting member 246. The planet carrier member 214B is connected for common rotation with a fourth shaft or interconnecting member 248 and with a fifth shaft or interconnecting member 250. The planet gears 214D are each configured to intermesh with both the sun gear member 214A and the ring gear member 214C.

The planetary gear set 216 includes a sun gear member 216A, a ring gear member 216C and a planet gear carrier member 216B that rotatably supports a set of planet gears 216D (only one of which is shown). The sun gear member 216A is connected for common rotation with the first shaft or interconnecting member 252 and the input shaft or member 212. The ring gear member 216C is connected for common rotation with the fifth shaft or interconnecting member 250. The planet carrier member 216B is connected for common rotation with a sixth shaft or interconnecting member 252. The planet gears 216D are each configured to intermesh with both the sun gear member 216A and the ring gear member 216C.

The planetary gear set 218 includes a sun gear member 218A, a ring gear member 218C and a planet gear carrier member 218B that rotatably supports a set of planet gears 218D (only one of which is shown). The sun gear member 218A is connected for common rotation with a seventh shaft or interconnecting member 254 and an eighth shaft or interconnecting member 256. The ring gear member 218C is connected for common rotation with the sixth shaft or interconnecting member 252. The planet carrier member 218B is connected for common rotation with the output member 222. The planet gears 218D are each configured to intermesh with both the sun gear member 218A and the ring gear member 218C.

The input shaft or member 212 is continuously connected to an engine (not shown) or to a turbine of a torque converter (not shown). The output shaft or member 222 is continuously connected with the final drive unit or transfer case (not shown).

The torque-transmitting mechanisms or clutches 226 and 228 and brakes 230, 232 and 234 allow for selective interconnection of the shafts or interconnecting members, members of the planetary gear sets and the housing. For example, the first clutch 226 is selectively engageable to connect the second shaft or interconnecting member 244 and the third shaft or interconnecting member 246 with the output member 222. The second clutch 228 is selectively engageable to connect the seventh shaft or interconnecting member 254 and the eighth shaft or interconnecting member 256 with the input member 212 and the first shaft or interconnecting member 242. The first brake 230 is selectively engageable to connect the second shaft or interconnecting member 244 and the third shaft or interconnecting member 246 with the stationary element or the transmission housing 236 in order to restrict the members 244 and 246 from rotating relative to the transmission housing 236. The second brake 232 is selectively engageable to connect the fourth shaft or interconnecting member 248 and the fifth shaft or interconnecting member 250 with the stationary element or the transmission housing 236 in order to restrict the members 248 and 250 from rotating relative to the transmission housing 236. The third brake 234 is selectively engageable to connect the seventh shaft or interconnecting member 254 and the eighth shaft or interconnecting member 256 with the stationary element or the transmission housing 236 in order to restrict the members 254 and 256 from rotating relative to the transmission housing 236.

Figure 10:
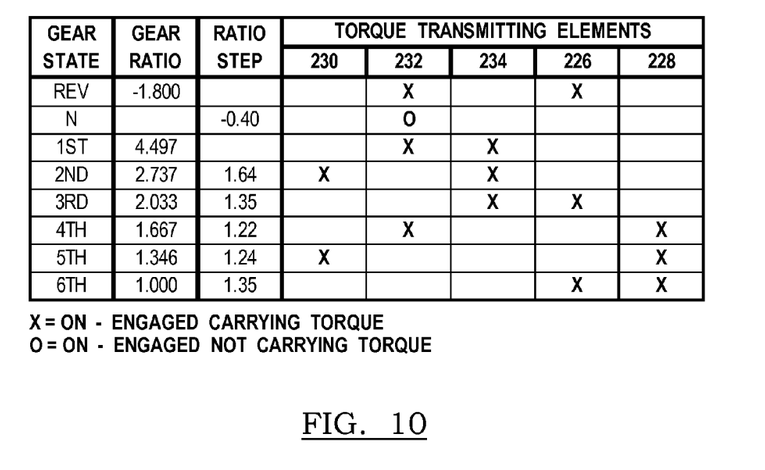
FIG. 10 is a truth table presenting the state of engagement of the various torque transmitting elements in each of the available forward and reverse speeds or gear ratios of the transmission illustrated in FIGS. 8 and 9.

Referring now to FIG. 9 and FIG. 10, the operation of the embodiment of the six speed transmission 200 will be described. It will be appreciated that transmission 200 is capable of transmitting torque from the input shaft or member 212 to the output shaft or member 222 in at least six forward speed or torque ratios and at least one reverse speed or torque ratio. Each forward and reverse speed or torque ratio is attained by engagement of one or more of the torque-transmitting mechanisms (i.e. first clutch 226, second clutch 228, first brake 230, second brake 232 and third brake 234), as will be explained below. FIG. 10 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 200. An example of the gear ratios that may be obtained using the embodiments of the present invention are also shown in FIG. 10. Of course, other gear ratios are achievable depending on the gear diameter, gear teeth count and gear configuration selected.

To establish a reverse gear, the first clutch 226 and the second brake 232 are engaged or activated. The first clutch 226 connects the second shaft or interconnecting member 244 and the third shaft or interconnecting member 246 with the output member 222. The second brake 232 connects the fourth shaft or interconnecting member 248 and the fifth shaft or interconnecting member 250 with the stationary element or the transmission housing 236 in order to restrict the members 248 and 250 from rotating relative to the transmission housing 236. Likewise, the six forward ratios are achieved through different combinations of clutch and brake engagement, as shown in FIG. 10.

It will be appreciated that the foregoing explanation of operation and gear states of the six speed transmission 200 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Figure 11:
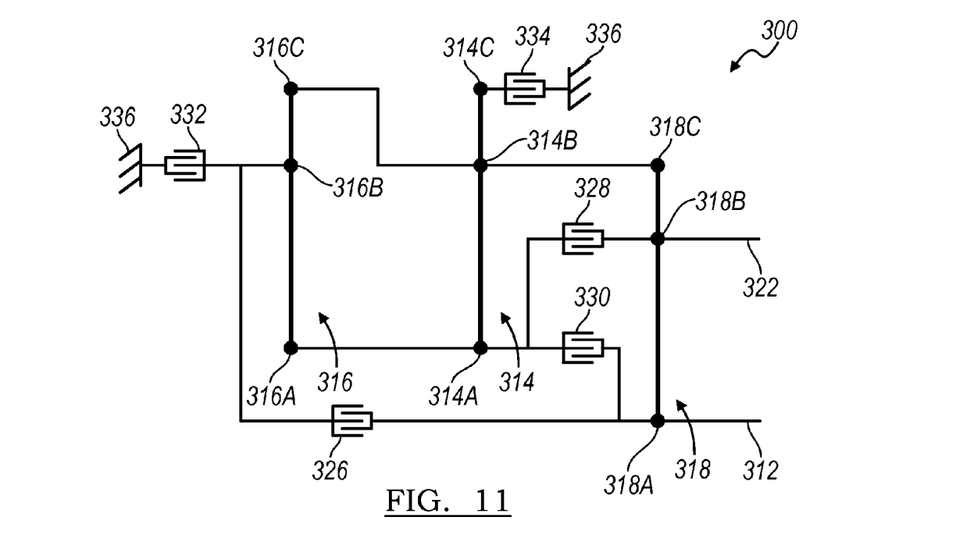
FIG. 11 is a lever diagram of an embodiment of a six speed transmission according to the present invention.

Referring now to FIG. 11, another embodiment of a six speed transmission 300 is illustrated in a lever diagram format. The transmission 300 includes an input shaft or member 312, a first planetary gear set 314, a second planetary gear set 316, a third planetary gear set 318 and an output shaft or member 322. The first planetary gear set 314 has three nodes: a first node 314A, a second node 314B and a third node 314C. The second planetary gear set 316 has three nodes: a first node 316A, a second node 316B and a third node 316C. The third planetary gear set 318 has three nodes: a first node 318A, a second node 318B and a third node 318C.

The input member 312 is continuously coupled to the first node 318A of the third planetary gear set 318. The output member 322 is coupled to the second node 318B of the third planetary gear set 318. The third node 316C of the second planetary gear set 316 is coupled to the second node 314B of the first planetary gear set 314 and to the third node 318C of the third planetary gear set 318. The first node 316A of the second planetary gear set 316 is coupled to the first node 314A of the first planetary gear set 314.

A first clutch 326 selectively connects the input member 312 and the first node 318A of the third planetary gear set 318 with the second node 316B of the second planetary gear set 316. A second clutch 328 selectively connects the output member 322 and the second node 318B of the third planetary gear set 318 with the first node 314A of the first planetary gear set 314 and the first node 316A of the second planetary gear set 316. A third clutch 330 selectively connects the input member 312 and the first node 318A of the third planetary gear set 318 with the first node 314A of the first planetary gear set 314 and the first node 316A of the second planetary gear set 316. A first brake 332 selectively connects the second node 316B of the second planetary gear set 316 with a stationary member or transmission housing 336. A second brake 334 selectively connects the third node 314C of the first planetary gear set 314 with a stationary member or transmission housing 336.

Figure 12:
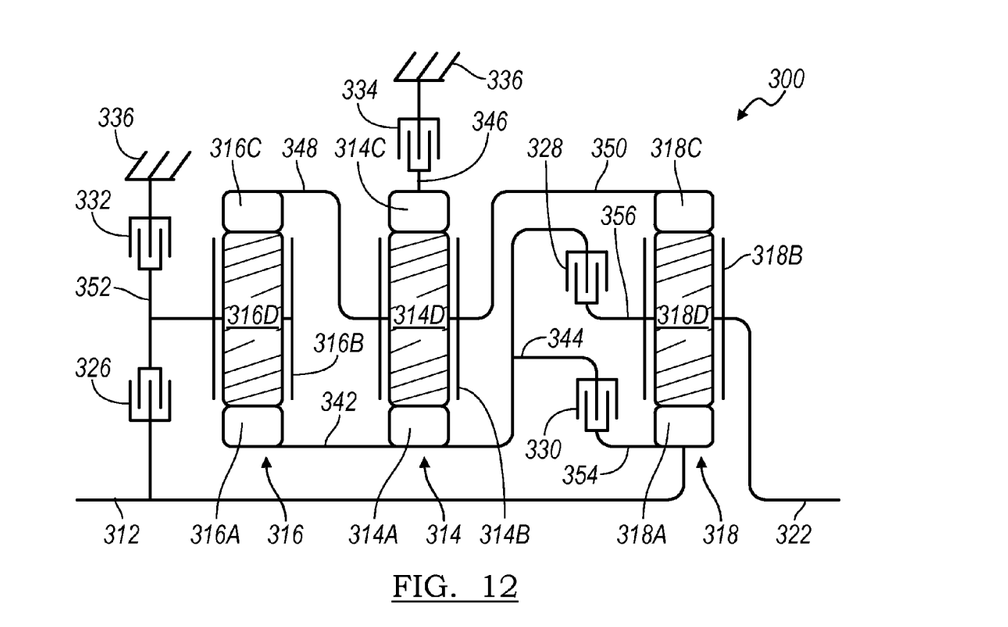
FIG. 12 is a diagrammatic illustration of an embodiment of a six speed transmission according to the present invention.

Referring now to FIG. 12, a stick diagram presents a schematic layout of the embodiment of the six speed transmission 300 according to the present invention. In FIG. 12, the numbering from the lever diagram of FIG. 11 is carried over. The clutches and couplings are correspondingly presented whereas the nodes of the planetary gear sets now appear as components of planetary gear sets such as sun gears, ring gears, planet gears and planet gear carriers.

For example, the planetary gear set 314 includes a sun gear member 314A, a ring gear member 314C and a planet gear carrier member 314B that rotatably supports a set of planet gears 314D (only one of which is shown). The sun gear member 314A is connected for common rotation with a first shaft or interconnecting member 342 and a second shaft or interconnecting member 344. The ring gear member 314C is connected for common rotation with a third shaft or interconnecting member 346. The planet carrier member 314B is connected for common rotation with a fourth shaft or interconnecting member 348 and a fifth shaft or interconnecting member 350. The planet gears 314D are each configured to intermesh with both the sun gear member 314A and the ring gear member 314C.

The planetary gear set 316 includes a sun gear member 316A, a ring gear member 316C and a planet gear carrier member 316B that rotatably supports a set of planet gears 316D (only one of which is shown). The sun gear member 316A is connected for common rotation with the first shaft or interconnecting member 342. The ring gear member 316C is connected for common rotation with the fourth shaft or interconnecting member 348. The planet carrier member 316B is connected for common rotation with a sixth shaft or interconnecting member 352. The planet gears 316D are each configured to intermesh with both the sun gear member 316A and the ring gear member 316C.

The planetary gear set 318 includes a sun gear member 318A, a ring gear member 318C and a planet gear carrier member 318B that rotatably supports a set of planet gears 318D (only one of which is shown). The sun gear member 318A is connected for common rotation with a seventh shaft or interconnecting member 354 and the input member 312. The ring gear member 318C is connected for common rotation with the fifth shaft or interconnecting member 350. The planet carrier member 318B is connected for common rotation with an eighth shaft or interconnecting member 356 and with the output member or shaft 322. The planet gears 318D are each configured to intermesh with both the sun gear member 318A and the ring gear member 318C.

The input shaft or member 312 is continuously connected to an engine (not shown) or to a turbine of a torque converter (not shown). The output shaft or member 322 is continuously connected with the final drive unit or transfer case (not shown).

The torque-transmitting mechanisms or clutches 326, 328, 330 and brakes 332 and 334 allow for selective interconnection of the shafts or interconnecting members, members of the planetary gear sets and the housing. For example, the first clutch 326 is selectively engageable to connect the sixth shaft or interconnecting member 352 with the seventh shaft or interconnecting member 354 and the input member 12. The second clutch 328 is selectively engageable to connect the first shaft or interconnecting member 342 and the second shaft or interconnecting member 344 with the eighth shaft or interconnecting member 356 and the output member 322. The third clutch 330 is selectively engageable to connect the first shaft or interconnecting member 342 and the second shaft or interconnecting member 344 with the seventh shaft or interconnecting member 354 and the input member 312. The first brake 332 is selectively engageable to connect the sixth shaft or interconnecting member 352 with the stationary element or the transmission housing 336 in order to restrict the member 352 from rotating relative to the transmission housing 336. The second brake 334 is selectively engageable to connect the third shaft or interconnecting member 346 with the stationary element or the transmission housing 336 in order to restrict the member 346 from rotating relative to the transmission housing 336.

Figure 13:
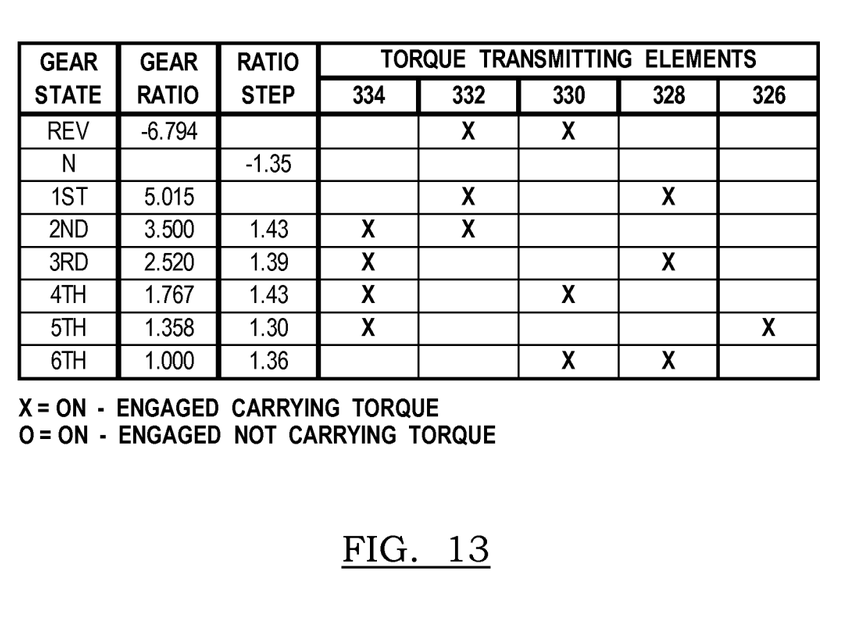
FIG. 13 is a truth table presenting the state of engagement of the various torque transmitting elements in each of the available forward and reverse speeds or gear ratios of the transmission illustrated in FIGS. 11 and 12.

Referring now to FIGS. 12 and 13, the operation of the embodiment of the six speed transmission 300 will be described. It will be appreciated that transmission 300 is capable of transmitting torque from the input shaft or member 312 to the output shaft or member 322 in at least six forward speed or torque ratios and at least one reverse speed or torque ratio. Each forward and reverse speed or torque ratio is attained by engagement of one or more of the torque-transmitting mechanisms (i.e. first clutch 326, second clutch 328, third clutch 330, first brake 332 and second brake 334), as will be explained below. FIG. 13 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 300. An example of the gear ratios that may be obtained using the embodiments of the present invention are also shown in FIG. 13. Of course, other gear ratios are achievable depending on the gear diameter, gear teeth count and gear configuration selected.

To establish a reverse gear, the third clutch 330 and the first brake 332 are engaged or activated. The third clutch 330 connects the first shaft or interconnecting member 342 and the second shaft or interconnecting member 344 with the seventh shaft or interconnecting member 354 and the input member 312. The first brake 332 connects the sixth shaft or interconnecting member 352 with the stationary element or the transmission housing 336 in order to restrict the member 352 from rotating relative to the transmission housing 336. Likewise, the six forward ratios are achieved through different combinations of clutch and brake engagement, as shown in FIG. 13.

It will be appreciated that the foregoing explanation of operation and gear states of the six speed transmission 300 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
 an input member;
 an output member;
 first, second and third planetary gear sets each having first, second and third members, wherein the second members are carrier members, wherein the input and output members are each interconnected to at least one of the first, second, and third planetary gear sets, wherein the input member is continuously interconnected to the third member of the third planetary gear set;
 a first interconnecting member continuously interconnecting the second member of the first planetary gear set with the first member of the second planetary gear set and the first member of the third planetary gear set;
 a second interconnecting member continuously interconnecting the third member of the first planetary gear set with the second member of the second planetary gear set; and
 five torque transmitting mechanisms each selectively engageable to interconnect at least one of the first, second and third members of the first, second and third planetary gear sets with at least one other of the first, second, third members and a stationary member, and wherein the torque transmitting mechanisms are selectively engageable in combinations of at least two to establish at least six forward speed ratios and at least one reverse speed ratio between the input member and the output member.

2. The transmission of claim 1 wherein a first of the five torque transmitting mechanisms is selectively engageable to interconnect the third member of the third planetary gear set and the input member with the third member of the second planetary gear set.

3. The transmission of claim 2 wherein a second of the five torque transmitting mechanisms is selectively engageable to interconnect the third member of the third planetary gear set and the input member with the third member of the first planetary gear set and the second member of the second planetary gear set.

4. The transmission of claim 3 wherein a third of the five torque transmitting mechanisms is selectively engageable to interconnect the third member of the second planetary gear set with the second member of the third planetary gear set and the output member.

5. The transmission of claim 4 wherein a fourth of the five torque transmitting mechanisms is selectively engageable to interconnect the third member of the first planetary gear set and the second member of the second planetary gear set with the stationary member.

6. The transmission of claim 5 wherein a fifth of the five torque transmitting mechanisms is selectively engageable to interconnect the first member of the first planetary gear set with the stationary member.

7. The transmission of claim 1 wherein the first member of the first planetary gear set, the third member of the second planetary gear set and the third member of the third planetary gear set are sun gears, and the third member of the first planetary gear set, the first member of the second planetary gear set and the first member of the third planetary gear set are ring gears.

8. The transmission of claim 1 wherein two of the torque transmitting mechanisms are brakes for connecting a plurality of the first, second, and third members to the stationary member and three of the torque transmitting mechanisms are clutches for connecting at least one of the first, second, and third members of the first, second and third planetary gear sets to at least one other first, second and third members.

9. The transmission of claim 1 wherein the output member is continuously interconnected to the second member of the third planetary gear set.

* * * * *